June 27, 1967 E. L. ROBEY, JR., ETAL 3,328,781

MEMORY PLANE FRAME ASSEMBLIES

Filed Oct. 1, 1963 4 Sheets-Sheet 1

INVENTORS.
EDMUND L. ROBEY, JR.
and ERNEST G. SLANEY
BY
Spencer E. Olson
ATTORNEY.

INVENTORS.
EDMUND L. ROBEY, JR. and
ERNEST G. SLANEY
BY
Spencer E. Olson
ATTORNEY.

INVENTORS.
EDMUND L. ROBEY, JR. and
ERNEST G. SLANEY
BY
Spencer E. Olson
ATTORNEY.

INVENTORS.
EDMUND L. ROBEY, JR.
and ERNEST G. SLANEY

BY Spencer E. Olson

ATTORNEY.

3,328,781

MEMORY PLANE FRAME ASSEMBLIES

Edmund L. Robey, Jr., and Ernest G. Slaney, Montoursville, Pa., assignors to Sylvania Electric Products Inc., a corporation of Delaware Filed Oct. 1, 1963, Ser. No. 312,975

10 Claims. (Cl. 340—174)

ABSTRACT OF THE DISCLOSURE

A frame and connection assembly for memory planes arranged in a stacked array, each of the memory planes comprising a rectangular array of wires threaded through and supporting an array of magnetic cores. The array of wires in each plane is supported by a rectangular frame assembled from standard dielectric board strip stock having a standard arrangement of slots and grooves or holes. Standard terminal lugs for securing the array of wires in the plane are mounted along the outer edge of each of the strips by snapping them into the slots and grooves with the lug terminal posts being arranged to project outwardly from the strips and be alternately offset on opposite sides thereof. The four strips of each frame are overlapped at their ends so that the resulting offset provides a spacing between adjacent frames in the stack, and the stacked frames are arranged so that alternate pairs of terminal posts of adjacent frames are juxtaposed to enable series connection of corresponding address wires in each memory plane.

This invention relates to memory systems used for the storage of information in digital computers and more particularly to an improved frame and connection structure for magnetic core memory planes.

The purpose of a memory system in a digital computer is to provide storage for the data necessary for the solution of a problem and to make this information readily available. The development of memory systems has therefore been directed toward obtaining large data storage capacity and high access speed in a unit of minimum volume. One of the first electronic memory systems used over 100 bistable multivibrators just to store a single ten-decimal-digit word. The search for more economical and higher performance memories has led to the development of several types, using different storage principles. The more important types presently used are mercury delay lines, cathode ray tubes, magnetic drums, tape recorders and magnetic cores. Each of these types have unique characteristics which lend themselves to particular storage applications. In general, a storage unit with a large capacity has an inherently long access time. For example, a magnetic tape unit has a large storage capacity but relatively slow access to specific memory locations; it is therefore used for bulk storage of reference data. On the other hand, a magnetic core storage device has an exceptionally high access speed but relatively low storage capacity; hence, it is suitable for use as the main internal memory of the computer. Accordingly, memory systems in most modern computers include several different storage units combined to facilitate maximum computing speed, and special computers may employ a single memory which lends itself to the specific task of the computer.

The present invention is concerned with the construction of magnetic core memories, and, as a particular example, the commonly used coincident-current magnetic core memory will be considered. A coincident-current memory system comprises a stack of several magnetic core matrices, called "memory planes," a small section of one of which is illustrated in FIG. 1. Each memory plane consists of an array of ferrite cores arranged in rows and columns and threaded with four conductors. A typical memory plane might have 64 rows and 64 columns, thereby containing 4096 cores. Little space is taken up by the cores, however, since they are very tiny, often measuring only a few hundredths of an inch in diameter. Small cores are desirable since they switch faster and require less magnetizing force to change their condition.

FIG. 2 shows more clearly how the four wires thread each core. The X and Y address wires determine the coordinate locations of each core within the plane and provide a means of gaining access to a single, selected core within the array for inserting or removing data. Each core can store one binary digit (bit) of information since it can be magnetically saturated to either the ONE or ZERO polarity. As is well known to the art, a selected core may be switched from a ZERO to a ONE by simultaneously applying half-select current pulses to the X and Y address wires that intersect at the selected core; for example, referring to FIG. 1, if half-select pulses are simultaneously applied to row X1 and column Y3, only the core at the intersection of X1 and Y3 switches. The selected core may be cleared to ZERO by applying the X and Y half-select current pulses in the opposite direction. The operation of clearing the core to ZERO is employed to read out the bit stored in a selected core in a memory plane. If the core is in the ONE condition, clearing to ZERO will result in a change of flux, thereby generating a signal in the output or sense wire. If the core is already in the ZERO state, there is no change of flux and no output signal. As shown in FIG. 1, the sense wire threads each core in a plane so that an output signal always occurs on a common output line, regardless of which core is cleared to zero. Hence, if a plane contains 4096 cores, one out of a possible 4096 stored bits may be read out of the sense wire associated with that plane.

A computer word (number) consists of from one to N binary digits or bits. Hence, to store 4096 fiifty-bit words, for example, fifty such memory planes would be required. The drive lines of the stack of planes are usually connected in series as shown for the case of one of the X address wires in FIG. 3. That is, the address wires of corresponding rows and columns in each adjacent plane are connected in series. When half-select curent pulses are simultaneously applied to an X and Y address wire, therefore, the same core position is switched to a binary ONE in each of the several planes. In order to retain a ZERO on selected ones of the planes, an inhibit wire is associated with each plane.

In FIG. 2, if a half-select current pulse is applied to the inhibit wire in a direction opposite to that of the X address current, its effect is canceled, and the signal Y address half-select current is not sufficient to switch the core to a ONE. As shown in FIG. 1, the inhibit wire is threaded through each core in the plane; hence, when it is triggered, no core in that plane can switch to the ONE state. The stack of N core planes is sensed in parallel to read out the stored bits of a vertical line of N cores, thereby providing an N-bit word.

The above described wire strung memory planes are supported in frames having terminals for making the various wiring connections and interconnections.. Currently used frame and connection structures are generally of a printed circuit type similar to that illustrated in FIGS. 4*a*, 4*b* and 4*c*. Referring to FIG. 4*a*, a frame 10 is shown having mounting holes 12, printed circuit traces 14, and core matrix 16. The X and Y address wires are connected to corresponding circuit traces, and the sense and inhibit wires are threaded through all cores with their respective ends connected to two pairs of terminals (not shown). Frame 10 is fabricated from a square piece of phenolic board stock or other suitable dielectric material. The core area 16 and mounting holes 12 are blanked out, the resulting scrap material being waste. Referring to FIG. 4*b* which shows a large scale view of a section of the frame shown in FIG. 4*a*, minus wiring connections, each printed circuit trace 14 has a drilled and plated-through hole 18 and a milled slot 20. The X or Y address wire is internally connected to each trace 14 by threading the wire through hole 18 and hand soldering. To enable the smallest possible spacing between address wires, the traces for adjacent address wires are printed on opposite sides of the board, as illustrated by the dotted line trace 14*a*; also the corresponding plated through holes and slot depths are offset. Referring to FIG. 4*c*, which is a side view of a stack of such frames or memory planes, each frame 10 is separated from the frame below it by a spacer 22 of sufficient thickness to enable hand soldering of riser wires 24 in slots 20 and other connections. The stack of frames may be secured in vertical alignment by bolts 26 passing through mounting holes 12, and nuts 28. The riser wires provide the series connection between corresponding address wires of adjacent frames. This connection is made at opposite ends of adjacent address wires in a frame for ease of hand soldering.

The frame construction illustrated in FIG. 4 has several disadvantages. Design and fabrication are time-consuming and costs are relatively high when one considers the following steps involved: (1) design a frame which is of the printed circuit type, (2) layout circuitry, (3) prepare artwork, (4) make silk screens, (5) etching and plating processes, (6) drilling and milling, (7) the frame requires the use of a blanking die, leaving considerable waste material; and (8) connections are hand soldered. Hand soldering of circuit boards, of course, always presents the hazard of delaminating the trace. The spacers required, to allow hand soldering, result in a package of relatively large volume; the most compact memory plane package obtainable using this approach is with the cores strung on 0.050″ centers.

Another design approach that has been developed for the connection terminals, with the object of overcoming the aforementioned disadvantages of the printed circuit approach, is shown in FIG. 5. In this case, the connection terminals are provided by lugs 30 molded in a frame 32. A riser wire 34 is used to connect adjacent frames. This design also results in a package of relatively large volume, however, and the plastic frame is dimensionally unstable under severe temperature variations, thereby causing the lugs to rock. The design is particularly unsatisfactory for this latter reason.

With an appreciation of the foregoing and other shortcomings of memory plane frame assemblies in current use, applicants have as a primary object of this invention to provide an improved frame and connection structure for magnetic core memory planes which avoids nearly all of these unfavorable conditions.

Another object is to provide standardized frame and terminal configurations that are readily adaptable to any size magnetic core memory plane structure.

Another object of the invention is to provide a magnetic core memory system which is substantially reduced in size.

A further object of the invention is to provide a magnetic core memory system in which the design and manufacturing costs are substantially reduced.

Other objects of the invention are to provide a frame and connection structure for magnetic core memory planes which requires no printed circuitry, permits automatic soldering of series connections, and which substantiallly simplifies design.

Briefly, the magnetic core memory plane frame according to the invention is assembled from standard strip stock of a suitable dielectric board having a standard arrangement of slots and grooves or pierced holes. Standard terminal lugs are mounted into the slots and grooves or holes of the frame material by snapping them into place to provide readily accessible connection terminals for the address wires of the memory plane. Four-sided frames are assembled with the four strips overlapping at their ends, the resulting offset providing some spacing between adjacent frames within a stacked array. The configuration and arrangement of the lugs permits the use of automatic soldering techniques, thereby eliminating the need for hand soldering and the spacers required therefor, with an attendant substantial reduction in package size (primarily height) and fabrication time and cost.

Other objects, features and advantages of the invention, and a better understanding of its construction will be had from the following detailed description taken in conjunction with the accompanying drawings, in which.

Figure 5:
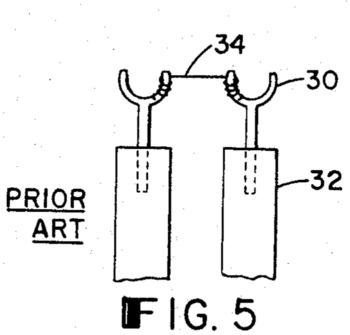
Figure 4A:
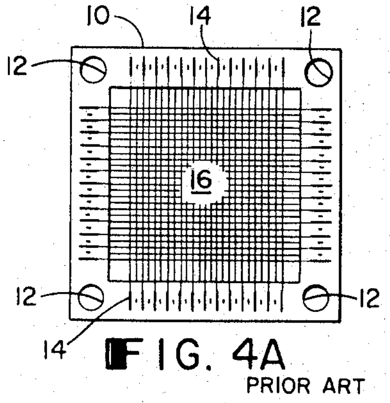
FIG. 4A PRIOR ART
Figure 4C:
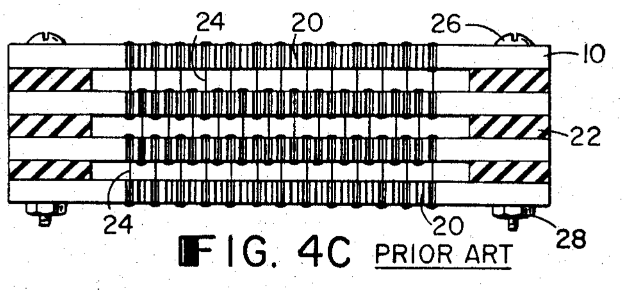
FIG. 4C PRIOR ART
Figure 4B:
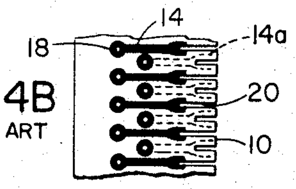
FIG. 4B PRIOR ART
Figure 6A:
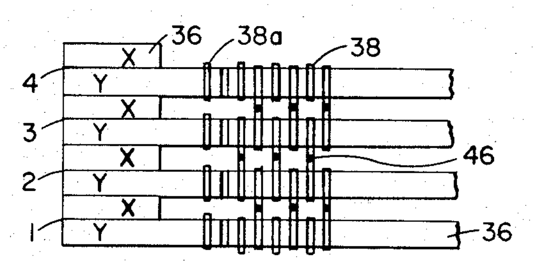
Figure 6:
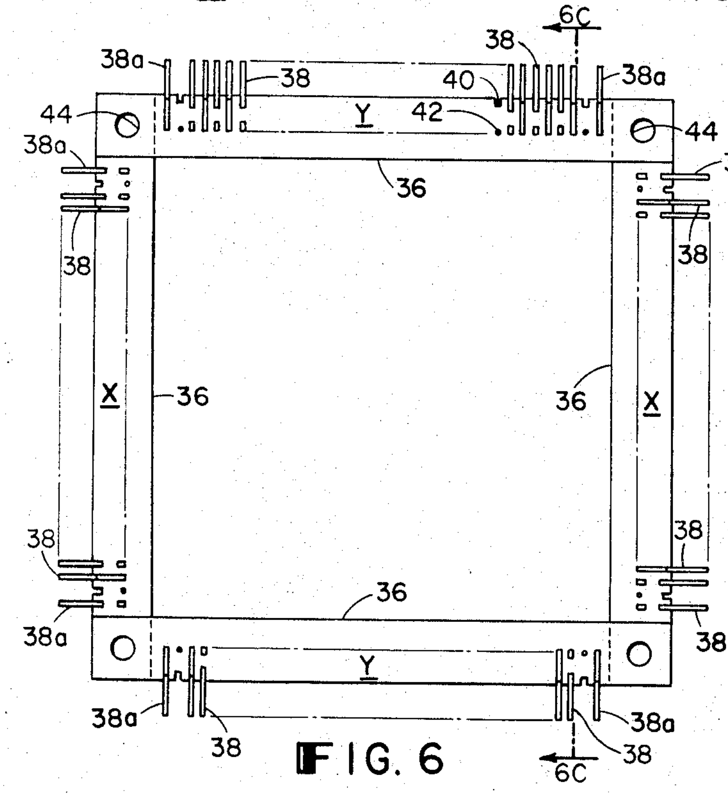
Figure 6C:
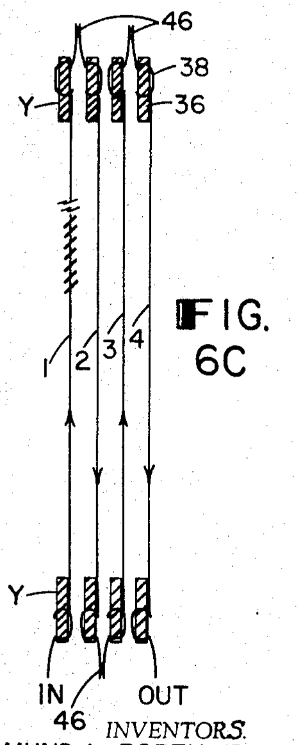
Figures 6B, 7A, 7B, 8A, 8B:
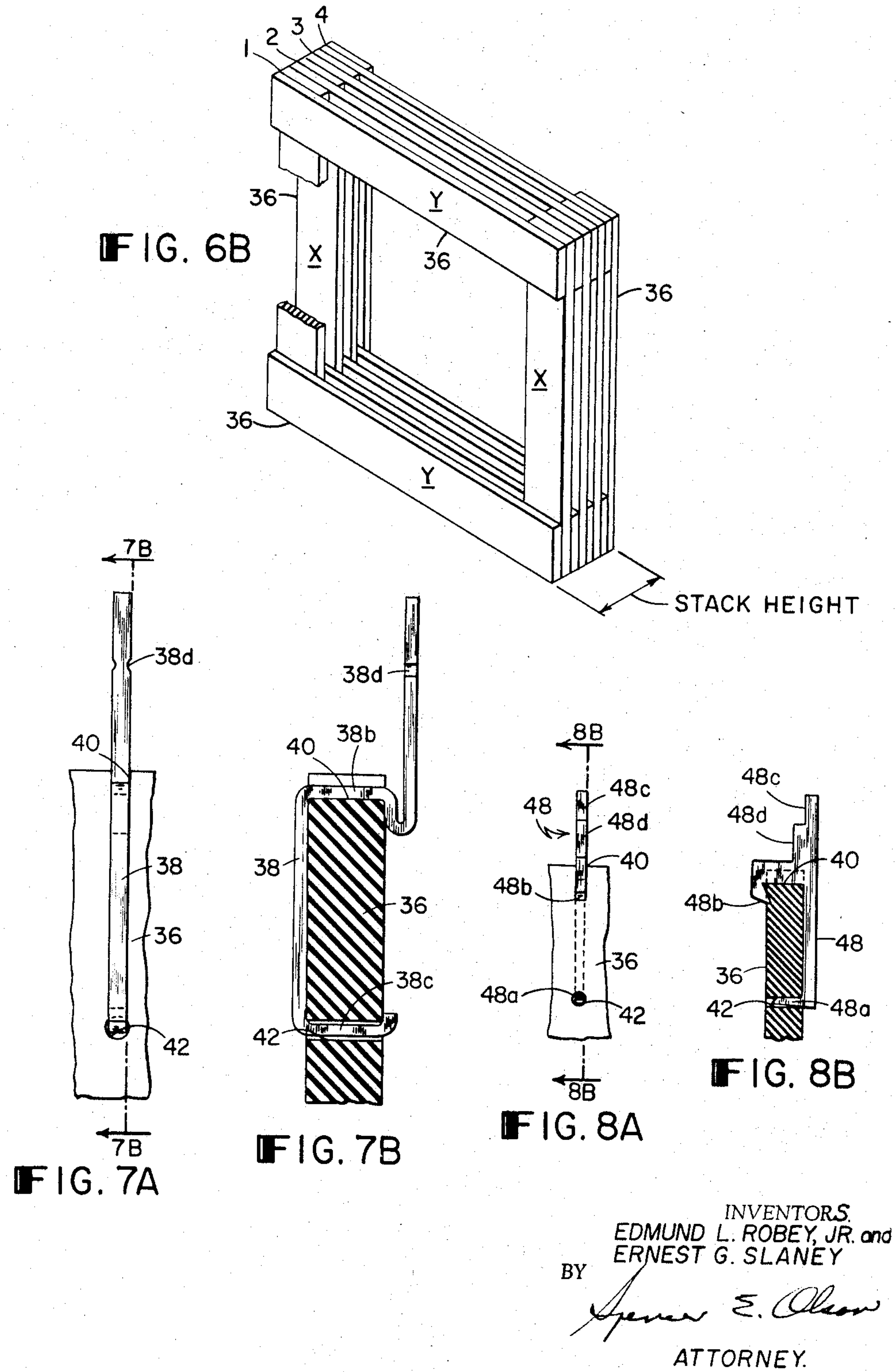
Figure 9A:
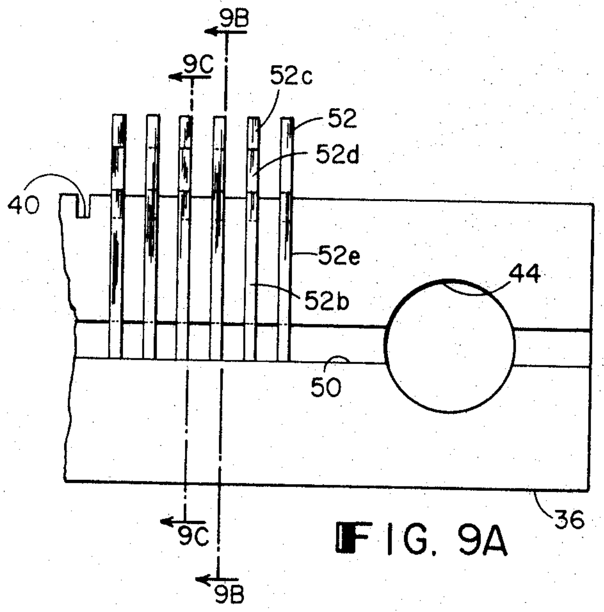
Figures 9B, 9C:
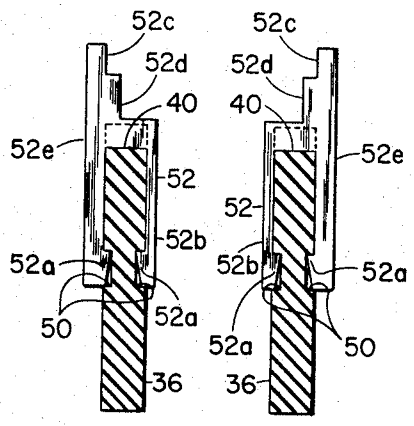

FIGS. 4*a*, 4*b* and 4*c* are respectively a plan view, a large scale fragmentary view, and a side view of a stack of memory planes of a prior art construction technique referred to earlier and to which further reference will not be made;

FIG. 5 is an illustration of another prior art construction technique referred to earlier and to which further reference will not be made;

FIG. 6 is a simplified plan view of a memory plane frame and connection structure in accordance with the present invention;

FIG. 6*a* is a fragmentary side view of the structure shown in FIG. 6;

FIG. 6*b* is a simplified isometric view of the structure shown in FIG. 6;

FIG. 6*c* is a cross section taken in the direction of the arrows **6*c*—6*c*** of FIG. 6;

FIGS. 7*a* and 7*b* are respectively front and cross-sectional fragmentary views, greatly enlarged, of a memory plane frame showing the attachment of a staple-type terminal lug thereto;

FIGS. 8*a* and 8*b* are respectively front and cross-sectional fragmentary views of a memory plane frame illustrating an alternate type of terminal lug; and FIGS. 9*a*, 9*b* and 9*c* are respectively front and two cross-sectional fragmentary views of an alternate memory plane frame fabrication and having alternate type of terminal lug mounted thereon.

Referring now to FIG. 6, the memory plane frame and connection structure in accordance with the present invention comprises four identical frame strips 36 having a specified number of identical terminal lugs 38 mounted thereon. The details of suitable frame and lug configurations will be described later, but for purposes of the immediate discussion, the lugs 38 will be considered to be of a simple staple type having terminal posts extending outward from the frame, with the frame having a uniform arrangement of slots 40 and holes 42 into which the lugs are inserted by snapping them into place. The frame strips 36 are identical and are fabricated from standard strip stock of a relatively rigid dielectric board material with a pair of mounting holes 44, one at each end, and lug mounting slots 40 and holes 42 uniformly arranged therebetween. The holes and slots may be formed by drilling and milling, respectively, or other suitable manufacturing methods.

The lugs are mounted on the strips in a manner to accommodate automatic dip soldering procedures and to avoid undesirable solder bridging. Specifically, the lugs 38 are arranged with their terminal posts alternately offset on either side of the frame material. The effect of this offset method in a stacked array of memory planes is illustrated in the fragmentary side view of FIG. 6*a*. The black dots on FIG. 6*a* identify where the terminal post extensions of adjacent planes are juxtaposed so as to provide, after soldering, an external series connection 46 between planes. FIGS. 6 and 6*a* also illustrate how the frame strips labeled Y overlap the frame strips labeled X to provide a stacked assembly of four-sided frames while affording a suitable spacing between terminal planes. An assembly of a plurality of the planes may be secured together by passing bolts through mounting holes 44. A simplified isometric view of the stack assembly is shown in FIG. 6*b*.

Figure 3:
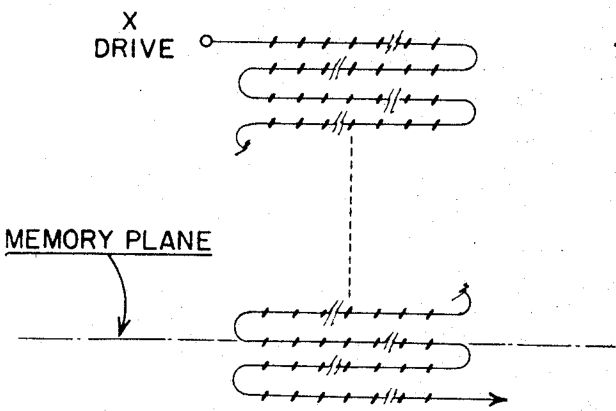
FIG. 3 is a schematic illustration of the circuit of a single address wire in a stack of memory planes, also referred to earlier.

The connections 46 of terminal lugs on adjacent planes provide the series circuit connections between the magnetic core address wires of corresponding rows and columns in adjacent planes, as previously described in connection with FIG. 3. The physical arrangement of this circuitry will be more clearly understood from FIG. 6*c*. In this cross-sectional view, the Y address wires in memory planes 1 through 4 are shown supported between corresponding Y address terminal frame strips 36. The ends of each address wire are wrapped around the terminal post of corresponding lugs 38 mounted on corresponding frame strips so that they are electrically and mechanically secured by the soldering process. In operation, a half select current applied to the lug marked "in" will flow through the plane 1 address wire in the direction of the arrow, through a junction 46 to the plane 2Y address wire, through the plane 2 address wire in the direction of the arrow, and so on through planes 3 and 4 to the lug terminal marked "out," whereby a corresponding Y column in each of the four planes is energized by a single half-select current drive pulse. It will be readily apparent from FIG. 6*c* that the terminal lugs 38 for a vertical column are closely juxtaposed, the shaded area between the extending terminal posts being the approximate area of the solder junction 46.

The above description is equally applicable to each address wire X-row and Y-column, with the previously mentioned exception that the series connections of adjacent rows and columns are alternately offset with respect to each other. The resulting connection pattern illustrated by the black dots in FIG. 6*a* prevents undesired solder bridging which would "short" adjacent address wires. The same memory planes illustrated in FIG. 6*c* are illustrated in FIG. 6*a*. It will be noted that the space between adjacent memory planes is determined only by the thickness of the frame strips, a typical height dimension of a pair of such strips, or one memory plane, being 0.125″. Hence, in this case, the stack length is equal to the number of planes times 0.125″ or 8 planes to the inch, representing approximately a 50% reduction in stack length over prior art packaging. This dense memory plane stacking arrangement is enabled by the external connection arrangement of the terminal lugs, which permits dip soldering, thereby precluding the need for the bushings and spacers previously necessary with packaging designs requiring hand soldering of internally located connections.

Figure 1:
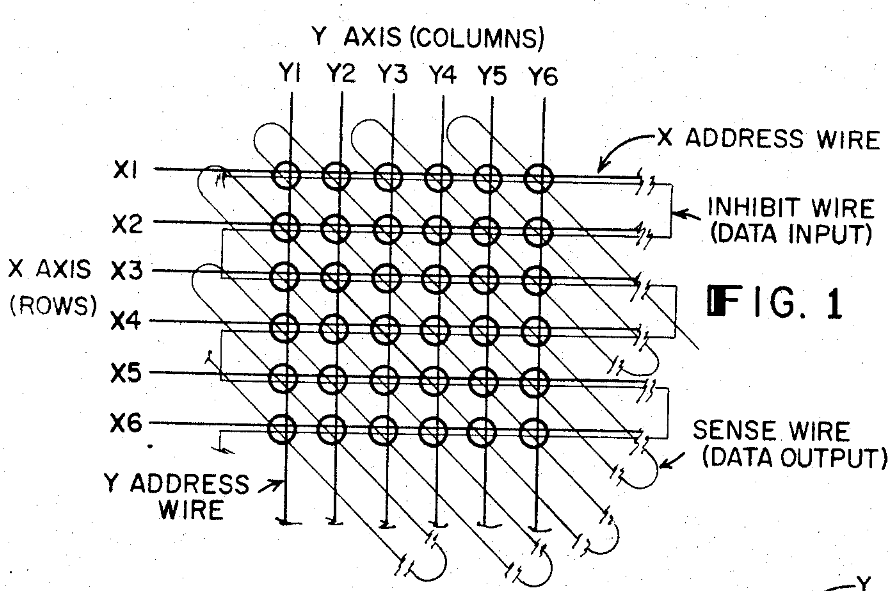
FIG. 1 is a schematic illustration of a section of a coincident-current magnetic core memory plane to which previous reference has been made.
Figure 2:
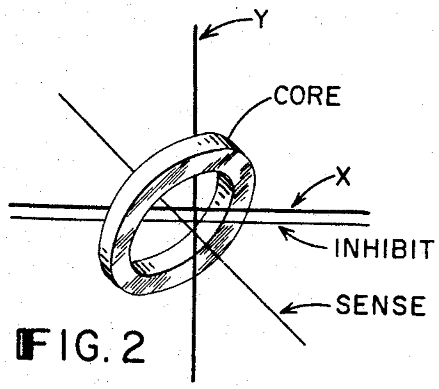
FIG. 2 is an illustration of the manner in which a single core is threaded on wires in the memory plane of FIG. 1, also referred to earlier.

As previously described with reference to FIGS. 1 and 2, inhibit and sense wire connections may also be required for each memory plane. Terminal posts for such connections may be conveniently provided on the frame shown in FIG. 6 by including additional terminal lugs spaced from the core matrix as illustrated by lugs 38*a* in FIGS. 6 and 6*a*.

The details of the staple-type terminal lug 38 and the way it is mounted on the strip 36 is more clearly shown in FIGS. 7*a* and 7*b*, which are respectively a front view and a cross-section view taken in the direction of arrows 7*b*—7*b* of FIG. 7*a*. The lug 38 may be fabricated using known staple manufacturing techniques from a suitable material, such as full hard beryllium copper, and treating it to provide good solderability, for example by tin plating. The lug is secured to frame strip 36 in a manner similar to that conventionally used for securing staples. In the example of FIG. 7, the two prongs 38*b* and 38*c* may be straight prior to mounting to permit insertion into slot 40 and hole 42, respectively, and thereafter crimped to the shape shown in FIG. 7*b*. Adjacent staples are mounted on opposite sides of the frame strip, as previously described. The insertion and crimping steps are readily adaptable to automatic machine methods. To facilitate external wiring of the memory plane, a wire wrap notch 38*d* is provided on the terminal post of lug 38.

A lug design preferred by applicants for reasons of economy and demonstrated ability to successfully withstand vibration and other environmental testing, is shown in FIGS. 8*a* and 8*b*, which are a front view and a cross-section view taken in the direction of arrows 8*b*—8*b* of FIG. 8*a*, respectively. The lug 48 is of modified C-shape having a prong 48*a* adapted for insertion in hole 42 of strip 36 and a hooked portion 48*b*, and may be die-stamped from a thin sheet of suitable material, such as full hard beryllium copper, and subsequently treated to provide good solderability, for example by tin plating. The lug may be mounted by hand tool or automatic insertion means by pressing it into slot 40 from above, tilting it so that prong 48*a* clears the frame, and then rotating the lug with a snapping action to force prong 48*a* into hole 42. This results in the lug being firmly seated, prong 48*a* having a chamfer to provide a swaging or gripping action when seated in the hole, the point on hooked portion 48*b* digging into the frame to provide a secure grip, and the sides of the slot preventing any swaying action. As previously described, adjacent lugs are alternately mounted on opposite sides of the frame 36. The corresponding address wire from the magnetic core matrix, having been threaded through the cores by techniques well known to the art, is wrapped around portion 48*c* of the lug terminal post. A step 48*d* is provided at the bottom of post 48*c* to space the wire the length of the step from the frame, and since the post 48*c* is the portion of the lug dipped in solder, the step 48*d* further prevents unwanted solder bridging between lugs. The wires may be wrapped on the lug terminal posts either manually or automatically. A simple wire wrap tool suitable for handling the extremely fine wire used on memory planes of the size here contemplated is described in co-pending application Ser. No. 313,050 filed Oct. 1, 1963, assigned to the assignee of the present invention and issued as U.S. Patent No. 3,229,729 on Jan. 18, 1966. The tool described therein wraps each turn of wire against the preceding turn on the terminal post, with no overlaps, and snaps the wire off at the corner of the terminal, rather than the side, after the desired number of turns have been applied.

An alternate die-stamped lug suitable for use in assembling the present memory plane is shown in FIG. 9. In this variation the frame strip 36 has slots 50 milled or otherwise formed in opposite sides thereof, rather than holes. The lugs 52 may be fabricated in the same manner as lug 48, with post 52*c* and step 52*d* providing the same functions as post 48*c* and step 48*d*, respectively, of lug 48. The lug is bifurcated to form two legs 52*b* and 52*e* each having an inwardly directed tong 52*a* at the lower end thereof. It may be mounted by hand tool or automatic insertion means by pressing it into slot 40 from above, the tongs 52*a* being spread apart to ride over the frame 36 until they snap into slots 50 upon being fully inserted. The tongs are chamfered to hook into the upper inside corner of the slots 50 and the sides of the slot 40 preventing any swaying action. The leg 52*b* is narrower than leg 52*e* since solder bridging is unwanted on this side of the lug; the greater width of legs 52*e* facilitate desired solder bridging on the terminal post side of the lug. As shown in FIG. 9 and previously described, adjacent lugs are mounted to alternately offset terminal posts on either side of the frame.

A memory plane frame and terminal lug structure in accordance with the present invention requires very little design time to prepare it for production. For example, to determine the external dimensions of the frame for a given core matrix size, it is necessary merely to multiply the number of drive lines by the dimension of the magnetic core centers, and add a constant dimension to account for frame strip surface for the mounting holes 44 and inhibit and sense winding terminals. This can be computed in about five minutes, and, within one hour, production drawings of strips and fabricated frame can be issued to production. Further, using the disclosed frame design, it is possible to string a memory with 0.030–0.018" cores on 0.035" centers, and, indeed, it is probable that the cores can be strung on 0.030" centers. Using the printed circuitry frames of the prior art, it has been impossible to achieve better than 0.050" centers. Since all wire leads are wrapped on connectors exterior to the frame, it is possible to reduce the space between planes and automatically dip solder all series connectors on one side at a time. The design does not require the use of spacers and bushings, since one frame acts as a spacer for the next adjacent frame, enabling the stacking of eight memory planes to the inch, nearly a 50% reduction in stack height over previous designs. The frames require no printed circuitry, all four pieces of the frame may be identical, and all lugs may be identical. Previous printed circuit designs required spacers to enable hand soldering between lead connection points of adjacent frames. It is clear, therefore, that the present invention provides significant advantages of miniaturization, standardization, versatility, and manufacturing cost reduction.

Although there has been described what are now considered to be preferred embodiments of the invention, modifications that fall within the scope and spirit of the invention will occur to those skilled in the art. It is therefore to be understood that the invention is not to be limited to the exact embodiments and applications illustrated and described except as such limitations appear in the appended claims.

What is claimed is:

1. In a magnetic core memory, a stack comprising a plurality of frames each supporting a rectangular array of wires which thread and support an array of magnetic cores, each of said frames being formed of first and second pairs of strips of insulating material of equal thickness, one strip of each of said pairs being identical with the other strip of the same pair, the ends of the strips in said first pair overlapping the ends of the strips of said second pair to form a rectangular frame, said frames being stacked one upon the other with said pairs of strips always in the same relative position whereby adjacent frames are spaced from each other by the thickness of the strips.

2. The assembly of claim 1 wherein all of said strips are of identical dimensions and form square frames.

3. The assembly of claim 1 further including a plurality of terminal lugs secured to and distributed along the outer edge of each of said strips and having terminal posts projecting outwardly therefrom, said array of wires being secured on the terminal posts of corresponding ones of said terminal lugs, the terminal posts of adjacent lugs on each strip being alternately offset substantially in the planes of opposite faces of the strip, and the terminal posts of corresponding lugs on corresponding strips of adjacent frames being offset in opposite directions.

4. The assembly of claim 3 wherein all of said strips are of identical dimensions and form square frames.

5. A frame for supporting a rectangular array of wires, comprising, first and second pairs of strips of insulating material arranged to form a rectangular frame wherein the ends of said first pair of strips respectively overlap the ends of said second pair of strips, each of said strips having a plurality of slots therethrough distributed along the external edge thereof atnd having concavities rectilinearly displaced from each of said slots inwardly from the external edge, and terminal lugs mounted in at least some of said slots, each of said lugs including means for gripping a respective one of said concavities and further including a terminal post offset from the plane of the strip and extending outwardly from said external edge of said strip, the terminal posts of the lugs in immediately adjacent slots being alternately offset on opposite sides of the strip.

6. A frame in accordance with claim 5 wherein said concavities are perforations extending through said strip and each of said terminal lugs is bifurcated so as to engage both sides of said strip and includes a first tong inserted in and engaging a perforation in said strip and a second tong engaging the side of the strip opposite from the sides from which said first tong is inserted.

7. A frame in accordance with claim 5 wherein said concavities are perforations extending through said strip and each of said lugs comprises an elongated strip bent into a U-shape having a first shorter leg extending into a perforation and a second longer leg extending through a corresponding slot from the same side of said strip as said first leg, said longer leg being crimped against the opposite side of said strip and extending from the external edge of said strip in a plane parallel to and offset from the plane of the strip.

8. A frame in accordance with claim 5 wherein said concavities are a pair of longitudinal slots one in each side of said strips parallel to and equally spaced from said external edge, and each of said terminal lugs is bifurcated to form first and second tongs of a length to engage and grips said slots.

9. A magnetic core memory assembly comprising a plurality of frames each supporting X coordinate address wires and Y coordinate address wires which thread and support an array of magnetic cores, each of said frames including first and second pairs of strips of insulating material arranged in a square with the ends of said first pair of strips overlapping the ends of said second pair of strips to thereby provide a spacing between adjacent frames within a stacked array of said frames equal to the thickness of said strips, each of said strips having a plurality of slots therethrough distributed along the external edge thereof and having concavities rectilinearly displaced inwardly from each of said slots, and terminal lugs mounted in at least some of said slots, each of said lugs including means for gripping a respective one of said concavities and further including a terminal post offset from the plane of the strip and projecting outwardly from said external edge in a plane parallel to the plane of said strip, said address wires being secured on the terminal posts of corresponding ones of said terminal lugs, the terminal posts of the lugs in immediately adjacent slots of any strip being alternately offset on opposite sides of that strip, said frames being stacked one upon the other with corresponding strips in adjacent frames so arranged that alternate offset terminal posts in one strip are juxtaposed with reversely offset terminal posts in the other strip.

10. A frame and connection assembly for magnetic core memory planes having X-coordinate address wires and Y-coordinate address wires which thread and support an array of magnetic cores, said assembly comprising a first pair of terminal strips in each memory plane supporting said X-coordinate address wires, a second pair of terminal strips in each memory plane supporting said Y-coordinate address wires, said strips being arranged to form a rectangular frame for each memory plane wherein said first pair of strips respectively overlap the ends of said second pair of strips whereby a spacing is provided between adjacent frames within a stacked array and the X-coordinate address wires and the Y-coordinate address wires are supported in different planes of the same frame, terminal lugs mounted on said terminal strips having a terminal post offset from the central plane of the strip and projecting outwardly from said frame, said address wires being secured on the terminal posts of corresponding ones of said terminal lugs, said terminal lugs being arranged whereby alternate pairs of terminal posts of adjacent frames are juxtaposed to enable series connection of corresponding address wires in each memory plane upon application of solder to said juxtaposed terminal posts to connect adjacent address wires in the same memory plane to the opposite end of corresponding wires in an adjacent memory plane.

No references cited.

LEWIS H. MYERS, *Primary Examiner.*

D. L. CLAY, *Assistant Examiner.*